US 11,650,754 B2

(12) United States Patent
Liang et al.

(10) Patent No.: US 11,650,754 B2
(45) Date of Patent: May 16, 2023

(54) DATA ACCESSING METHOD, DEVICE, AND STORAGE MEDIUM

(71) Applicant: BEIJING BAIDU NETCOM SCIENCE AND TECHNOLOGY CO., LTD., Beijing (CN)

(72) Inventors: Zihao Liang, Beijing (CN); Jian Ouyang, Beijing (CN)

(73) Assignee: KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 64 days.

(21) Appl. No.: 16/689,479

(22) Filed: Nov. 20, 2019

(65) Prior Publication Data

US 2020/0159461 A1 May 21, 2020

(30) Foreign Application Priority Data

Nov. 21, 2018 (CN) .......................... 201811391728.6

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0653* (2013.01); *G06F 3/0656* (2013.01); *G06F 3/0683* (2013.01)

(58) Field of Classification Search
None
See application file for complete search history.

(56) References Cited

U.S. PATENT DOCUMENTS

| 5,675,793 A | 10/1997 | Crick et al. |
| 9,251,058 B2 | 2/2016 | Nellans et al. |
| 2006/0064538 A1 | 3/2006 | Aizawa |

(Continued)

FOREIGN PATENT DOCUMENTS

| CN | 101251789 A | 8/2008 |
| CN | 103116552 A | 5/2013 |

(Continued)

OTHER PUBLICATIONS

Japanese Patent Application No. 2019-209717 Office Action dated Nov. 17, 2020, 3 pages.

(Continued)

*Primary Examiner* — Idriss N Alrobaye
*Assistant Examiner* — Dayton Lewis-Taylor
(74) *Attorney, Agent, or Firm* — Cozen O'Connor

(57) ABSTRACT

Embodiments of the present disclosure provide a data accessing method, a device and a storage medium. The method includes: obtaining a first accessing request and a second accessing request for a storage device; loading first data associated with the first accessing request from a source device to a pre-allocated buffer area with a size same as a size of a single physical storage block of the storage device; determining a first part of the second data when the first size of second data associated with the second accessing request is greater than or equal to the second size of an available space of the buffer area, a size of the first part being the same as the second size; and providing the first data and the first part to a target device associated with the first accessing request and the second accessing request.

17 Claims, 4 Drawing Sheets

(56) References Cited

U.S. PATENT DOCUMENTS

| | | |
|---|---|---|
| 2007/0214309 A1 | 9/2007 | Matsuura et al. |
| 2009/0157973 A1 | 6/2009 | Li et al. |
| 2010/0153654 A1 | 6/2010 | Vorbach et al. |
| 2010/0211710 A1* | 8/2010 | Weng .................. G06F 13/405 710/110 |
| 2013/0067174 A1 | 3/2013 | Moss et al. |
| 2013/0117503 A1 | 5/2013 | Nellans et al. |
| 2015/0331619 A1* | 11/2015 | Zheng .................. G06F 3/0679 711/154 |
| 2016/0350010 A1 | 12/2016 | Ryan et al. |
| 2017/0097897 A1 | 4/2017 | Saito |
| 2017/0192902 A1 | 7/2017 | Hwang et al. |

FOREIGN PATENT DOCUMENTS

| | | |
|---|---|---|
| CN | 105095109 A | 11/2015 |
| CN | 106469126 A | 3/2017 |
| CN | 108833336 A | 11/2018 |
| JP | 2006092169 A | 4/2006 |
| JP | 2007241576 A | 9/2007 |
| KR | 20050061529 A | 6/2005 |
| KR | 20170088933 A | 8/2017 |
| WO | WO 2017107162 A1 | 6/2017 |

OTHER PUBLICATIONS

Japanese Patent Application No. 2019-209717 English translation of Office Action dated Nov. 17, 2020, 3 pages.
Korean Patent Application No. 10-2019-0134312 Office Action dated Jan. 27, 2021, 6 pages.
Korean Patent Application No. 10-2019-0134312 English translation of Office Action dated Jan. 27, 2021, 6 pages.
European Patent Application No. 19208851.6 extended Search Report and Opinion dated May 8, 2020, 9 pages.
Chinese Patent Application No. 201811391728.6, Office Action dated Jan. 10, 2023, 11 pages.
Chinese Patent Application No. 201811391728.6, English translation of Office Action dated Jan. 10, 2023, 21 pages.

* cited by examiner

DATA ACCESSING METHOD, DEVICE, AND STORAGE MEDIUM

CROSS-REFERENCE TO RELATED APPLICATION

This application claims priority to and benefits of Chinese Patent Application Serial No. 201811391728.6, filed with the State Intellectual Property Office of P. R. China on Nov. 21, 2018, the entire content of which is incorporated herein by reference.

FIELD

Embodiments of the present disclosure mainly relate to a field of data storage, and more particularly to a data accessing method, a device and a computer readable storage medium.

BACKGROUND

With the development of technologies, collaborative design of software and hardware has begun to be applied in various fields. Different from a traditional software design and a traditional hardware design, the collaborative design of hardware and software not only has software programmable flexibility, but also may utilize parallel processing and pipeline processing of hardware to improve the efficiency of data processing.

In a software-hardware collaborative system, there may be a plurality of coprocessors, and parts of coprocessors may access a same storage device simultaneously during work. Therefore, how to improve accessing efficiency of the storage device has become a focused issue.

SUMMARY

A data accessing method is provided. The method includes: obtaining a first accessing request and a second accessing request for a storage device; loading first data associated with the first accessing request from a source device to a pre-allocated buffer area, in which, a size of the buffer area is the same as a size of a single physical storage block of the storage device; determining whether a first size of second data associated with the second accessing request is lower than a second size of an available space of the buffer area; determining a first part of the second data in response to determining that the first size is greater than or equal to the second size, in which, a size of the first part is the same as the second size of the available space of the buffer area; and providing the first data and the first part to a target device associated with the first accessing request and the second accessing request.

A device is provided. The device includes one or more processors and a storage device. The storage device is configured to store one or more programs. When the one or more programs are executed by the one or more processors, the one or more processors are caused to implement the method according to the first aspect of the present disclosure.

A computer readable storage medium is provided, which has a computer program stored thereon. When the computer program is executed by a processor, the method according to the first aspect of the present disclosure is implemented.

It should be understood that, descriptions in summary of the present disclosure does not aim to limit a key or important feature in embodiments of the present disclosure, and does not used to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Embodiments of the present disclosure will be described in more detail below with reference to the accompanying drawings. Although certain embodiments of the present disclosure are illustrated in the accompanying drawings, it should be understood that the present disclosure may be implemented in various manners without being limited by the embodiments elaborated herein. On the contrary, embodiments are provided to make the present disclosure more thorough and complete. It should be understood that, the accompanying drawings and embodiments of the present disclosure are merely used for exemplary purposes, and are not used to limit the protection scope of the present disclosure.

In the description of embodiments of the present disclosure, the term "include" and similar terms are to be understood as open-contained, i.e., "including but not limited to". The term "based on" should be understood as "at least partly based on". The term "an embodiment" or "the embodiment" should be understood as "at least one embodiment". The terms "first", "second" and the like may represent different or the same objects. Other explicit and implicit definitions may also be included below.

Figure 1:
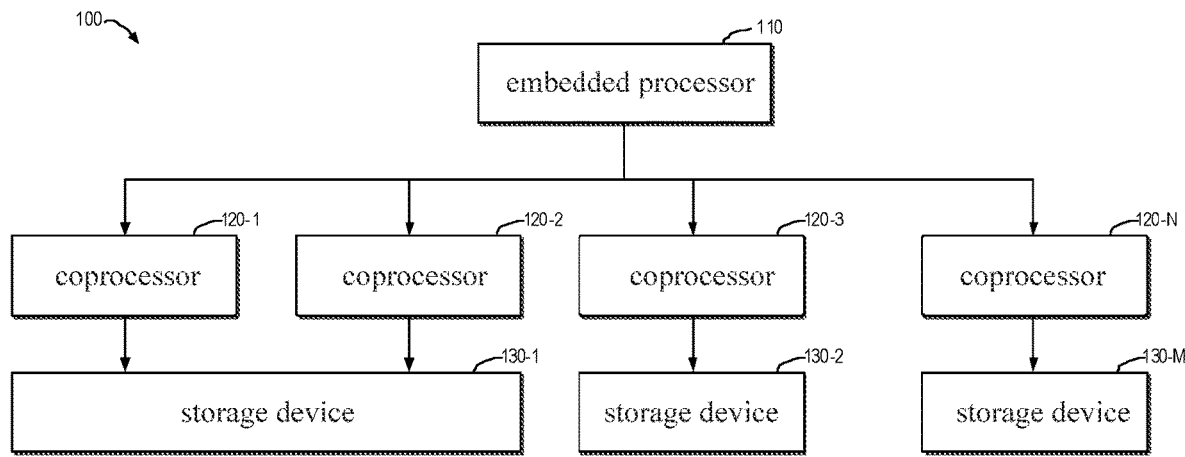
FIG. 1 is a schematic diagram illustrating a normal software-hardware collaborative system on chip.

As mentioned above, in a software-hardware collaborative system on chip (SoC), accessing efficiency of a storage device may affect data processing efficiency of the whole system directly. FIG. 1 is a schematic diagram illustrating the SoC 100 according to embodiments of the present disclosure. As illustrated in FIG. 1, the SoC 100 includes an embedded processor 110, a plurality of coprocessors associated with the embedded processor 110, which are coprocessor 120-1, coprocessor 120-2, coprocessor 120-3, . . . , and coprocessor 120-N (collectively or individually called coprocessor 120), and a plurality of storage devices, which are storage device 130-1, storage device 130-2, . . . , and storage device 130-M (collectively or individually called storage device 130). In some embodiments, the storage device 130 may include a read only memory (ROM), a programmable read only memory (PROM), an electronically programmable ROM (EPROM), a random access memory (RAM), or the like.

As illustrated in FIG. 1, a plurality of coprocessors (such as the coprocessor 120-1 and the coprocessor 120-2) may be associated with a single storage device (such as the storage device 130-1). Therefore, the coprocessor 120-1 and the coprocessor 120-2 may access the storage device 130-1 simultaneously. In this way, how to improve the accessing efficiency of the storage device 130 becomes a key of the SoC100.

In addition, in a hardware design, a size of a minimum unit of the storage device 130 (i.e. a size of a single physical storage block in the storage device 130) is usually greater than a size of a single piece of data that an operating system can process, such that a single physical address of the storage device 130 may store a plurality pieces of data. However, the operating system usually takes the size of the single piece of data as a minimum operation unit, such that the single physical address in the storage device 130 usually includes a plurality of file addresses. For example, an operating system with a processing precision of 32-byte single-precision floating-point numbers has a minimum operation unit which is 4 bytes, while a minimum unit in the storage device 130 may be, such as, 16 bytes.

In this case, when the coprocessor 120 performs a large amount of continuous accesses to the storage device 130, an access port of the storage device 130 may be occupied by the coprocessor 120 for a long time, while the coprocessor 120 only accesses the single piece of data (such as 4 bytes) of a file system each time. In this way, a supportable accessing bit width (such as 16 bytes) of the storage device 130 is greatly wasted, thus causing that the accessing efficiency of the storage device 130 is low.

According to embodiments of the present disclosure, a data accessing solution is provided. In this solution, when a first accessing request and a second accessing request for the storage device are obtained, a storage system writes first data associated with the first accessing request into a buffer area of which a size is the same as the size of the minimum unit of the storage device, it is determined whether a size of a remaining available space of the buffer area can support second data associated with the second accessing request, and the first data and a first part of the second data are provided to a target device associated with the first accessing request and the second accessing request when the available space is not enough to support the second data. The first part has a same size as the available space. Based on this way, the storage system may splice a plurality of accessing requests via the buffer area, such that utilization for an available bit width of the storage device may be maximized. In addition, during the splicing process, data only needs to be loaded into the buffer area once, thus improving the access efficiency of the storage system.

Figure 2:
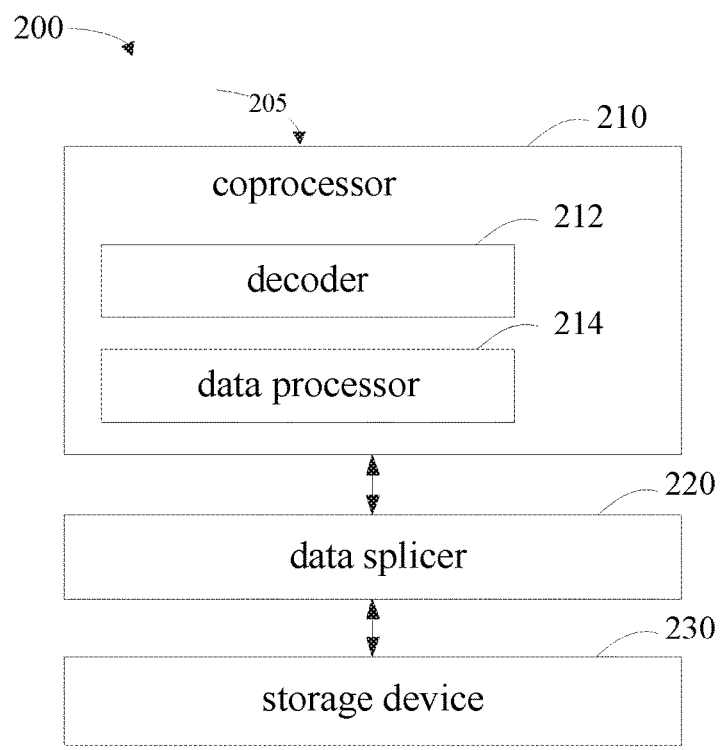
FIG. 2 is a schematic diagram illustrating a storage system according to an embodiment of the present disclosure.

A data accessing solution according to embodiments of the present disclosure will be described below with reference to FIG. 2-FIG. 4. FIG. 2 is a schematic diagram illustrating a storage system 200 according to an embodiment of the present disclosure. As illustrated in FIG. 2, the storage system 200 includes a coprocessor 210, a data splicer 220 and a storage device 230. In some embodiments, the storage device 230 may include a read only memory (ROM), a programmable read only memory (PROM), an electronically programmable ROM (EPROM), a random access memory (RAM), and the like. For example, the storage device 230 may be a static random access memory (SRAM) in the SoC 200.

As illustrated in FIG. 2, the coprocessor 210 may include a decoder 212 and a data processor 214. In some embodiments, the coprocessor 210, for example, may receive an accessing instruction from an embedded processor. In some embodiments, the accessing instruction may explicitly include a start address of data to be accessed, a type of the data, a length of the data, and the like. After the instruction is received, the coprocessor 210 may utilize the decoder 212 to perform decoding on the received instruction, such that an accessing request for a file system address in the instruction is converted to a plurality of accessing requests for a physical address of the storage device 230.

In some embodiments, the data splicer 220 may be configured to splice a plurality of accessing requests for different data, thus improving the efficiency of the storage system 200. The detailed procedure for splicing will be described in detail with reference to FIG. 3-FIG. 4. In some embodiments, the data processor 214 may be configured to process data fed back by the data splicer 220, for example, to perform aggregation operation.

Figure 3:
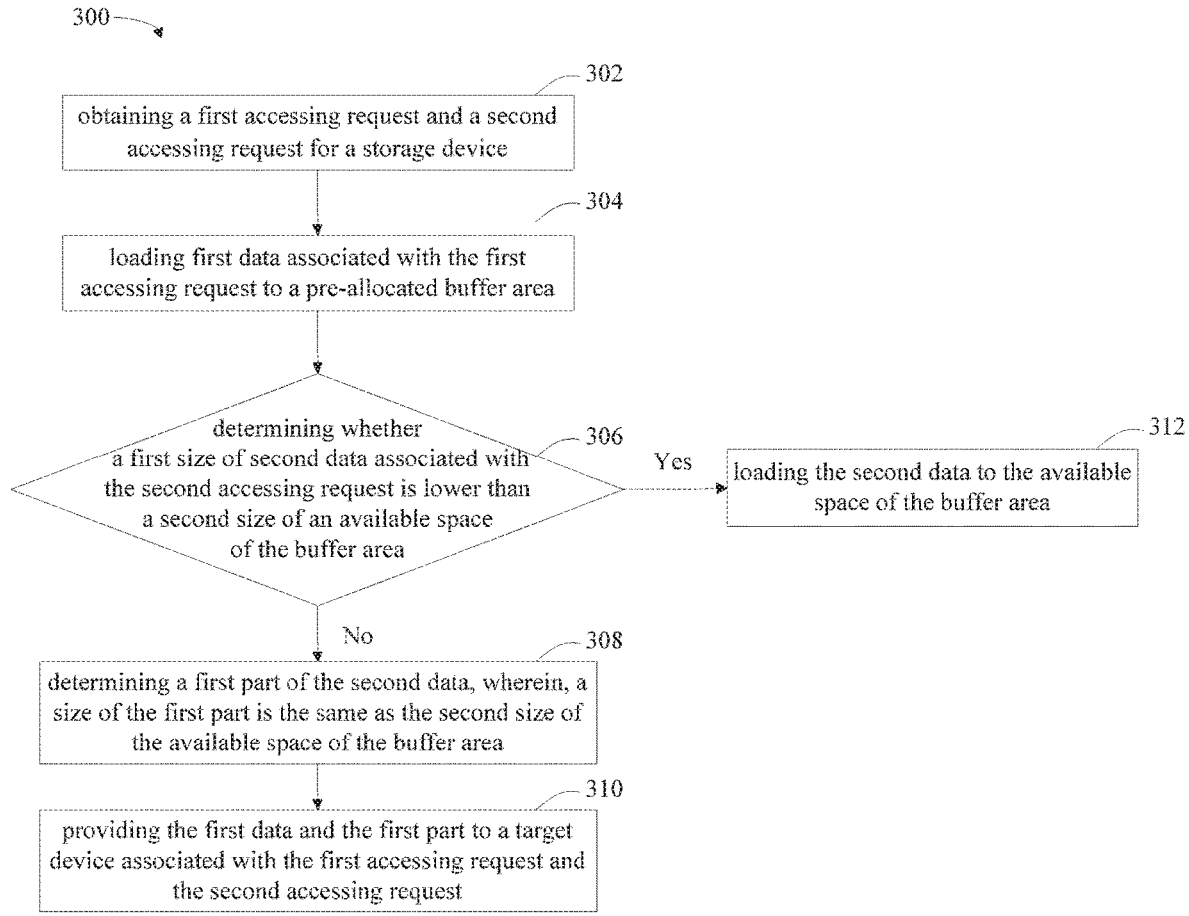
FIG. 3 is a flow chart illustrating a data accessing method according to an embodiment of the present disclosure.

FIG. 3 is a flow chart illustrating a data accessing method 300 according to an embodiment of the present disclosure. The method 300 may be implemented by the data splicer 220 in the storage system 200. The actions related to the method 300 will be described below with reference to the storage system 200 illustrated in FIG. 2.

At block 302, the data splicer 220 obtains a first accessing request and a second accessing request for the storage device 230. In some embodiments, as described above, the coprocessor 210 may utilize the decoder 212 to perform decoding on the received instruction, to convert the received instruction to a plurality of accessing requests for the storage device 230, and send the plurality of accessing requests to the data splicer 200. The first accessing request and the second accessing request for the storage device 230 are associated with a same system operation instruction.

In some embodiments, the first accessing request and the second accessing request may be reading requests for different physical addresses in the storage device 230. In some embodiments, the first accessing request and the second accessing request may have continuous target physical addresses. For example, the first accessing request may read the front 4 bytes in a specific storage block (such as, a storage having 16 bytes). The second accessing request may read the fifth byte to the eighth byte in the specific storage block. In some embodiments, the first accessing request and the second accessing request may have discontinuous target physical addresses. For example, the second accessing request may read data in a storage block which is different from a target storage block of the first accessing request, or the second accessing request may read different data in a storage block which is the same as the target storage block of the first accessing request.

In some embodiments, the data splicer 220 may receive a plurality of writing requests for different physical addresses in the storage device 230 from the coprocessor 210. Since data written into the storage device 230 are required to be continuous, the data splicer 220 may determine a first writing request and a second writing request from the plurality of writing requests in response to receiving the plurality of writing requests for the storage device 230. A target position in the storage device 230 for the first writing request is continuous with a target position in the storage device 230 for the second writing request. For example, the first accessing request may be a first one of writing requests executed sequentially. The first accessing request may direct at the front 4 bytes in a specific storage block (such as a storage having 16 bytes). In order to execute the writing correctly, the target physical address of the second writing request may be continuous with the target address of the first writing request. For example, the target physical address of the second writing request is the fifth byte to the eight byte in the specific block.

Figure 4A:
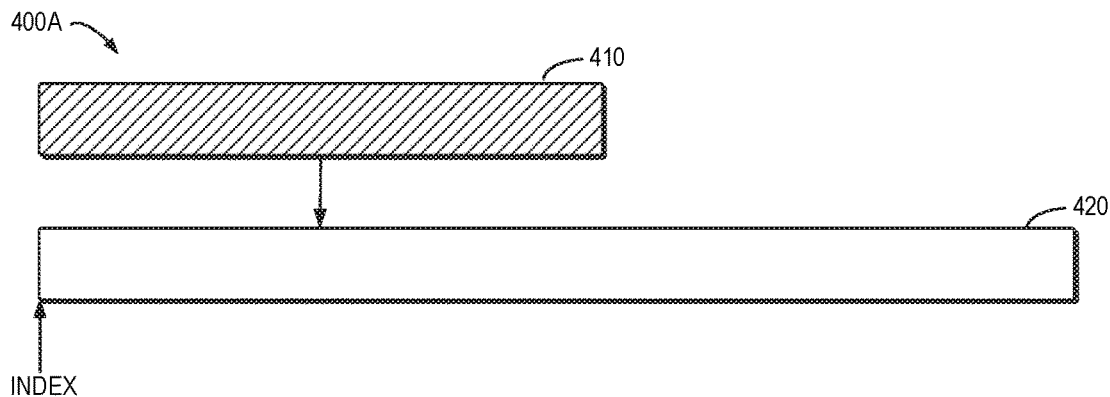
FIG. 4A-FIG. 4C are schematic diagrams illustrating performing splicing on different data according to one or more embodiments of the present disclosure.

At block 304, the data splicer 220 loads first data associated with the first accessing request from a source device to a pre-allocated buffer area. A size of the buffer area corresponds to a size of a single physical storage block of the storage device 230. In some embodiments, the data splicer 220 may constitute a buffer area which has the same size as a minimum unit of the storage device by employing a register. FIG. 4A is a schematic diagram illustrating performing splicing on different data according to an embodiment of the present disclosure. As illustrated in FIG. 4A, for example, a size of the first data 410 associated with the first accessing request is 10 bytes, and a size of the butter area 420 is aligned with the minimum unit of the storage device 230, which is 16 bytes.

In some embodiments, the data splicer 220 may further record a parameter INDEX. The parameter INDEX indicates a starting position of an available space in the buffer area 420. In some embodiments, when a writing is performed for the first time, the INDEX is set to 0 by default, and all space in the buffer area 320 is in an available state.

Figure 4B:
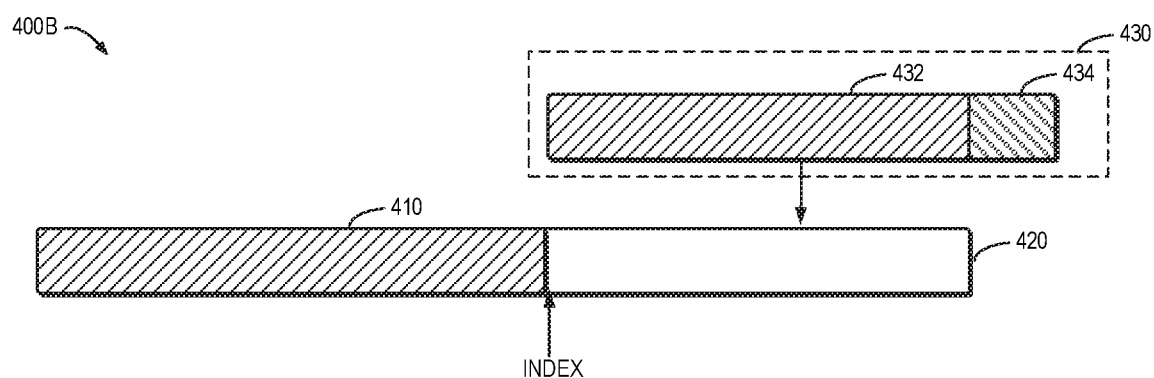
Figure 4C:
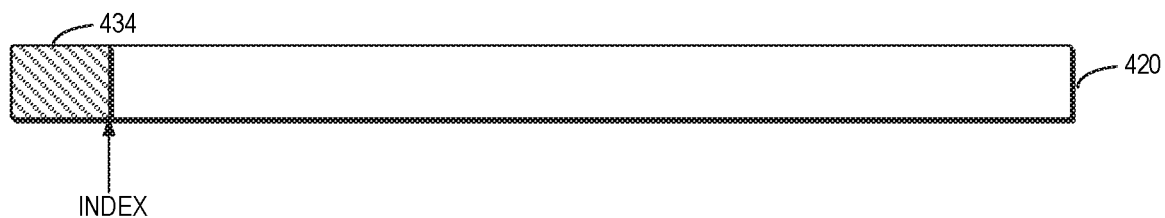

In some embodiments, when the first accessing request is a reading request, the data splicer 220 may read the first data from the storage device 230, and load the first data 410 to the buffer area 420. As illustrated in FIG. 4B, the data splicer 220 may further update a value of INDEX according to a size (10 bytes) of the first data 410. For example, the value of INDEX is updated to 10.

In some embodiments, when the first accessing request is a writing request, the data splicer 220 may obtain the first data 410 associated with the first accessing request according to the writing request sent from the coprocessor 210, and determine a deviation amount of the first data 410 in the target storage block. For example, if the first data 410 is located from the fifth byte to the eighth 8 byte in the target storage block (16 bytes), the deviation amount of the first data 410 is 5. Before the first data 410 is written into the butter area 420, the data splicer 220 may update the value of INDEX according to the deviation amount, for example, update the value of INDEX to 5. In the following, the data splicer 220 may write the first data 410 at the starting position indicated by the INDEX. For example, four bytes of the first data 410 is written into the fifth to the eighth bytes in the buffer area 420. In the following, as illustrated in FIG. 4B, the data splicer 220 may further update the value of INDEX according to the size (10 bytes) of the first data 410. For example, the value of INDEX is updated to 15.

Continuing with FIG. 3, at block 306, the data splicer 220 determines whether a first size of the second data associated with the second accessing request is lower than a second size of an available space of the buffer area. In some embodiments, the data splicer 220 may determine the size of the available space of the buffer area 420 according to the value of INDEX of the buffer area 420 and the size of the buffer area 420. For example, in the example about the reading request described above, the size of the available space is 6 bytes. For another example, in the example about the writing request described above, the size of the available space is 2 bytes.

In response to determining that the first size is greater than or equal to the second size at block 306, the method 300 proceeds to an action at block 308, that is, the data splicer 220 determines that the size of the second data associated with the second accessing request is lower than the second size of the available space of the buffer area. Continuing with FIG. 4, as illustrated in FIG. 4B, for example, the size of the second data 430 is 10 bytes, then the size of the second data 430 is greater than the available space of the buffer area 420. Detailed procedures at block 308 will be described below for situations of the reading request and the writing request respectively.

Continuing with the example described above that the first accessing request and the second accessing request are the reading requests, in some embodiments, for example, the data splicer 220 may determine that the size of the available space is 6 bytes according to the INDEX and the size of the buffer area 420, and the size of the available space is lower than the size (such as, 10 bytes) of the second data 430. And then, the data splicer 220 may divide the second data 430 into two parts according to the size (6 bytes) of the available space. A size of the first part 432 is the same as the size (6 bytes) of the available space. A remaining part of the second data 430 constitutes the second part (4 bytes). In this way, the first data 410 and the first part 432 of the second data 430 constitutes a size (16 bytes) of a minimum unit of the storage device 230.

Continuing with the example described above that the first accessing request and the second accessing request are the writing requests, in some embodiments, for example, the data splicer 220 may determine that the size of the available space is 2 bytes according to the INDEX and the size of the buffer area 420, and the size of the available space is lower than the size (such as, 10 bytes) of the second data 430. And then, the data splicer 220 may divide the second data 430 into two parts according to the size (2 bytes) of the available space. A size of the first part 432 is the same as the size (2 bytes) of the available space. A remaining part in the second data 430 constitutes the second part (8 bytes). In this way, the first data 410 and the first part 432 of the second data 430 constitutes the size (16 bytes) of the minimum unit of the storage device 230.

Continuing with FIG. 3, at block 310, the data splicer 220 provides the first data and the first part 432 to a target device associated with the first accessing request and the second accessing request.

Continuing with the example described above that the first accessing request and the second accessing request are the reading requests, in this case, the source device is the storage device 230, and the target device is the coprocessor 210. In some embodiments, the data splicer 220 may provide the first data 410 stored in the buffer area 420 and the first part 432 of the second data 430 to the data processor 214 in the coprocessor 210. In this way, the problem of misalignment between the minimum unit of the file system and the minimum unit of the storage device 230 is solved, and there is no need to read the first part 432 of the second data 430 to the buffer area 420, thus improving the reading efficiency of the storage system.

In some embodiments, after providing the first data 410 and the first part 432 of the second data 430 to the coprocessor 210, the data splicer 220 may update the available space of the buffer area 420 to all space of the buffer area 420 by resetting the value of INDEX to 0. In some embodiments, the data splicer 220 may write the second part 434 of the second data 430 into the buffer area 420, and update the value of INDEX based on the size (4 bytes) of the second part 434, for example, update to 4.

In some embodiments, the data splicer 220 may determine whether a third accessing request in the instruction associated with the first accessing request and the second accessing request is received. A type of the third accessing request is the same as the type of the first accessing request and the second accessing request (which are all reading requests in this example). When the data splicer 220 determines that the third accessing request is not received, the data splicer 220 may send valid data (such as, the second part 434) in the buffer area 420 to the coprocessor 210, thus completing all response to the instruction. When the data splicer 220 determines that the third accessing request is received, the data splicer 220 may perform data splicing for a new reading request based on the above method continuously, which is not elaborated herein.

In some embodiments, the data splicer 220 may write the first data 410 and the first part 432 of the second data 430 stored in the buffer area 420 into the target storage block in the storage device 230. In some embodiments, the data splicer 230 may generate a mask code signal according to a range of the valid data in the buffer area 420. For example, in the above example, there is no valid data at the front fourth bytes in the buffer area 420. Therefore, the mark code signal may be used to notice the storage device 230 not to perform data writing on the front fourth bytes in the corresponding storage block. In this way, the problem of misalignment between the minimum unit of the file system and the minimum unit of the storage device 230 is solved, and there is no need to write the first part 432 of the second data 430 into the buffer area 420, thus improving the writing efficiency of the storage system.

Continuing with the example described above that the first accessing request and the second accessing request are the writing requests, in this case, the source device is the coprocessor 210, and the target device is the storage device 230. In some embodiments, after writing the first data 410 and the first part 432 of the second data 430 into the storage device 230, the data splicer 220 may update the available space of the buffer area 420 to all space of the buffer area 420 by resetting the value of INDEX to 0. In some embodiments, the data splicer 220 may write the second part 434 of the second data 430 into the buffer area 420, and update the value of INDEX based on the size (8 bytes) of the second part 434, for example, update to 8.

In some embodiments, the data splicer 220 may determine whether the third accessing request in the instruction associated with the first accessing request and the second accessing request is received. The type of the third accessing request is the same as the type of the first accessing request and the second accessing request (which are all writing requests in this example). When the data splicer 220 determines that there is no third accessing request, the data splicer 220 may write valid data (such as, the second part 434) in the buffer area 420 into the coprocessor 210, thus completing all response to the instruction. When the data splicer 220 determines that there is a third accessing request, the data splicer 220 may further determine whether there is a writing request in which a target address is continuous with an address of the second part 434. When the data splicer 220 determines that there is a new accessing request, the data splicer 220 may perform data splicing for the new accessing request based on the above method continuously, which is not elaborated herein. When there is no writing request with the address continuous with the address of the second part 434, the data splicer 220 may write the valid data (such as, the second part 434) in the buffer area 420 into the storage device 230, and start to execute a next writing request to be executed.

In response to determining that the first size is lower than the second size at block 306, the method proceeds to an action at block 312, that is, the data splicer 220 writes the second data into the available space of the buffer area. In some embodiments, for example, when the second data 430 is lower than the size of the available space of the buffer area 420, the data splicer may write the second data 430 into the available space of the buffer area directly, and update the value of INDEX according to the size of the second data 430. For example, when the size of the second data 430 is 4 bytes and the original value of INDEX is 10, the updated value of INDEX is 14.

In some embodiments, the data splicer 220 may determine whether there is a new accessing request which may be spliced. When it is determined that there is the new accessing request, the data splicer 220 may continue to perform splicing operation according to the buffer area 420 and a new value of INDEX based on the above method. When it is determined there is no new accessing request, the data splicer may directly provide the valid data in the buffer area 420 to the target device associated with the first accessing request and the second accessing request, thus completing all response to the instruction.

With the method described above, the data accessing method of the present disclosure solves the problem of misalignment between hardware address space and software address space, thus improving a response efficiency of the storage system. In addition, with the method, by providing an independent data splicer, the independent data splicer may be appended to a coprocessor which does not support mis-aligned memory access, thus greatly improving the scalability of the method.

Figure 5:
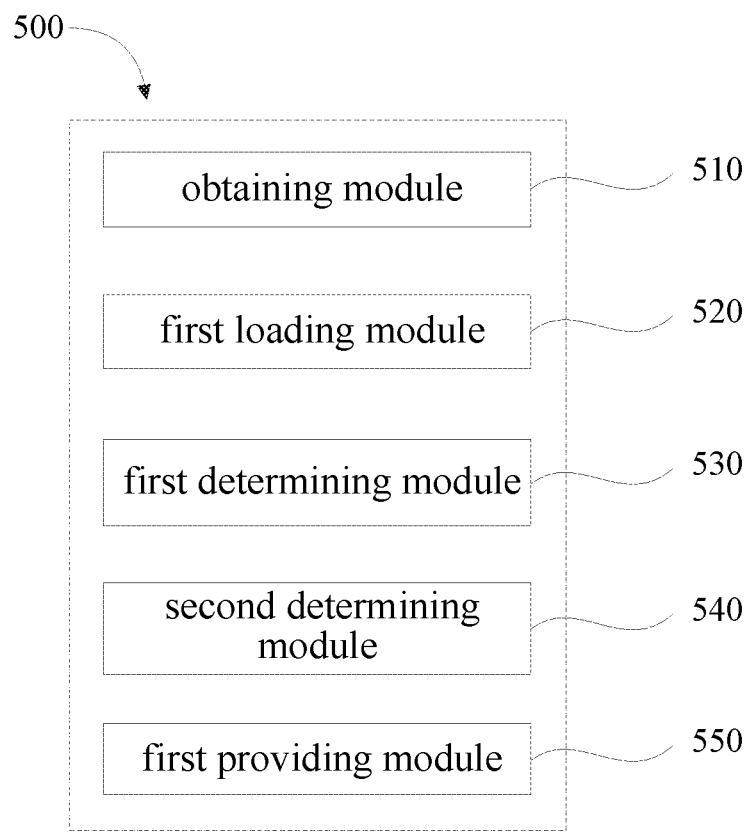
FIG. 5 is a block diagram illustrating a data accessing apparatus according to an embodiment of the present disclosure.

FIG. 5 is a block diagram illustrating a data accessing apparatus 500 according to an embodiment of the present disclosure. The apparatus 500 may be included in the data splicer 220 illustrated in FIG. 2, or implemented as the data splicer 220. As illustrated in FIG. 5, the apparatus 500 includes an obtaining module 510, configured to obtain a first accessing request and a second accessing request for a storage device. The apparatus 500 further includes a first loading module 520, configured to load first data associated with the first accessing request from a source device to a buffer area pre-allocated allocated. A size of the buffer area is the same as a size of a single physical storage block of the storage device. The apparatus 500 further includes a first determining module 530, configured to determine whether a first size of second data associated with the second accessing request is lower than a second size of an available space of the buffer area. The apparatus 500 further includes a second determining module 540, configured to determine a first part of the second data in response to determining that the first size is greater than or equal to the second size. A size of the first part is the same as the second size of the available space of the buffer area. In addition, the apparatus 500 further includes a providing module 550, configured to provide the first data and the first part to a target device associated with the first accessing request and the second accessing request.

In some embodiments, the apparatus 500 further includes: an updating module and a second loading module. The updating module is configured to update the available space of the buffer area as all space of the buffer area after providing the first data and the first part to the target device. The second loading module is configured to load a second part of the second data which is different from the first apart of the second data to updated available space.

In some embodiments, the apparatus 500 further includes: a third determining module and a second providing module.

The third determining module is configured to determine whether a third accessing request in an instruction associated with the first accessing request and the second accessing request is received. A type of the third accessing request is the same as a type of the first accessing request and the second accessing request. The second providing module is configured to provide the second part to the target device in response to determining that the third accessing request is not received.

In some embodiments, the apparatus 500 further includes: a third loading module, configured to load the second data to the available space of the buffer area in response to determining that the first size is lower than the second size.

In some embodiments, the apparatus 500 further includes: a fourth determining module and a third providing module. The fourth determining module is configured to determine whether a third accessing request in an instruction associated with the first accessing request and the second accessing request is received. A type of the third accessing request is the same as a type of the first accessing request and the second accessing request. The third providing module is configured to provide the first data and the second data to the target device in response to determining that the third accessing request is not received.

In some embodiments, the first accessing request and the second accessing request are reading requests, and the source device is the storage device.

In some embodiments, the first accessing request and the second accessing request are writing requests, the target device is the storage device. A first target position of the first accessing request in the storage device is continuous with a second target position of the second accessing request in the storage device.

Figure 6:
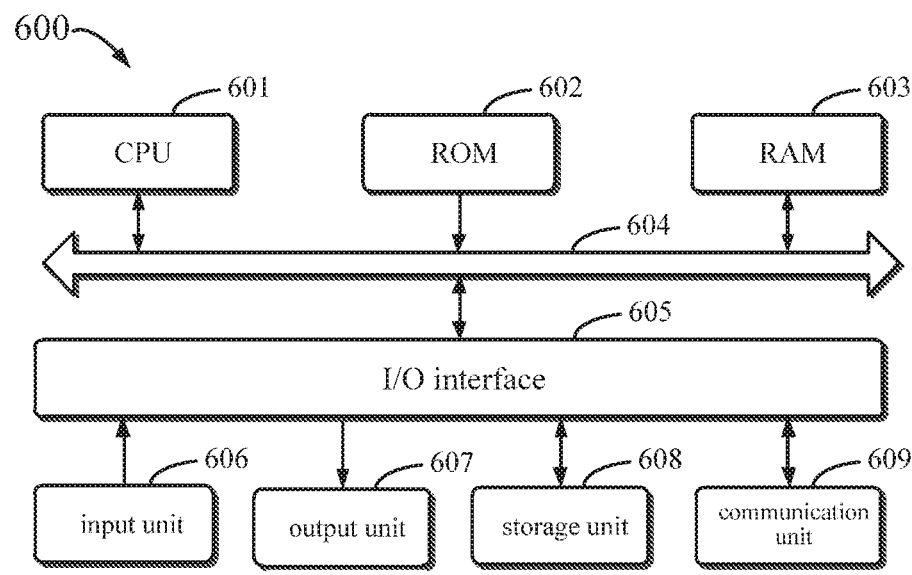
FIG. 6 is a block diagram illustrating a computing device capable of implementing one or more embodiments of the present disclosure.

FIG. 6 is a block diagram illustrating an exemplary device 600 for implementing embodiments of the present disclosure. As illustrated in FIG. 6, the device 600 includes a central processing unit (CPU) 601, which may execute various appropriate acts and processing based on computer program instructions stored in a read-only memory (ROM) 602 or computer program instructions loaded from a storage unit 608 to a random-access memory (RAM) 603. In the RAM 603, various programs and data needed for the operation of the device 600 may be stored. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard, a mouse, etc.; an output unit 607, such as various types of displays, speakers, etc.; the storage unit 608, such as a disk, a CD, etc.; and a communication unit 609, such as a network card, a modem, a wireless communication transceiver, etc. The communication unit 609 allows the device 600 to exchange information/data with other devices via computer networks such as the Internet and/or various telecommunications networks.

The processing unit 601 executes the various methods and procedures described above, such as the procedure 300. For example, in some embodiments, procedure 300 may be implemented as computer software programs, which are tangibly contained in a machine-readable medium, such as the storage unit 608. In some embodiments, some or all of the computer programs may be loaded and/or installed on the device 600 via the ROM 602 and/or the communication unit 609. One or more acts or steps of the procedure 300 described above may be executed when the computer programs is loaded to the RAM 603 and executed by the CPU 601. Alternatively, in other embodiments, the CPU 601 may be configured to execute the procedure 300 by any other appropriate ways (such as, by means of a firmware).

The above functions described herein may be executed at least partially by one or more hardware logic components. For example, without limitation, exemplary types of hardware logic components, including a field-programmable gate array (FPGA), an application-specific integrated circuit (ASIC), an application specific standard product (ASSP), a system on chip (SOC), a complex programmable logic device (CPLD) and so on, may be used.

The program codes for implementing the method of embodiments of the present disclosure may be written in any combination of one or more program languages. These program codes may be provided to a processor or a controller of a general-purpose computer, a special-purpose computer, or other programmable data-processing devices, such that the functions/operations regulated in the flow charts and/or block charts are implemented when the program codes are executed by the processor or the controller. The program codes may be completely executed on the machine, partly executed on the machine, partly executed on the machine as a standalone package and partly executed on a remote machine, or completely executed on a remote machine or a server.

In the context of the present disclosure, the machine readable medium may be a tangible medium, which may include or store the programs for use of an instruction execution system, apparatus or device or for use in conjunction with the instruction execution system, apparatus or device. The machine readable medium may be a machine readable signal medium or a machine readable storage medium. The machine readable medium may include but not limited to electronic, magnetic, optical, electromagnetic, infrared, or semiconductor systems, apparatuses or devices, or any appropriate combination of the foregoing contents. A more detailed example of the machine readable storage medium includes electrical connections based on one or more lines, a portable computer disk, a hard disk, a random access memory (RAM), a read-only memory (ROM), an erasable programmable read only memory (an EPROM or a flash memory), an optical fiber, a compact disc read-only memory (CD-ROM), an optical storage device, a magnetic storage device, or any appropriate combination of the above contents.

In addition, although respective act is described in a particular sequence, it should be understood that such act is required to be executed in the specified or sequential order as illustrated, or all illustrated acts are required to be executed to achieve a desired result. Under certain environment, multitasking and parallel processing may be beneficial. In the same way, although several specific implementation details are included in the above discussion, these should not be interpreted as limitations of the scope of the present disclosure. Certain features described in the context of a single embodiment may also be implemented in a single implementation in a combination manner. On the contrary, the various features described in the context of a single implementation may also be implemented in multiple implementations individually or in any appropriate sub-combination.

Although language specific to structural features and/or method logic actions has been employed to describe the embodiments of the present disclosure, it should be understood that the subject matter defined in the appended claims is not necessarily limited to the specific features or acts described above. On the contrary, the specific features or acts described above are merely an exemplary form for implementing the claims.

What is claimed is:

1. A data accessing method, comprising:
obtaining a first accessing request and a second accessing request for a storage device, wherein the first accessing request is associated with first data, and the second accessing request is associated with second data;
loading the first data from a source device to a pre-allocated buffer area, wherein, a size of the buffer area is the same as a size of a single physical storage block of the storage device;
determining whether a first size of the second data is lower than a second size of an available space of the buffer area, wherein the available space of the buffer area refers to a space remaining in a buffer after the first data is loaded to the buffer area;
determining a first part of the second data in response to determining that the first size of the second data is greater than or equal to the second size of the available space, wherein, a size of the first part of the second data is the same as the second size of the available space of the buffer area; and
splicing the first data and the first part of the second data, and providing the first data and the first part of the second data together to a target device associated with the first accessing request and the second accessing request;
updating the available space of the buffer area as all space of the buffer area after providing the first data and the first part of the second data to the target device; and
loading a second part of the second data which is different from the first part of the second data to the updated available space.

2. The method of claim 1, further comprising:
determining whether a third accessing request in an instruction associated with the first accessing request and the second accessing request is received, wherein, a type of the third accessing request is the same as a type of the first accessing request and the second accessing request; and
providing the second part of the second data to the target device in response to determining that the third accessing request is not received.

3. The method of claim 1, further comprising:
loading the second data to the available space of the buffer area in response to determining that the first size of the second data is lower than the second size of the available space.

4. The method of claim 3, further comprising:
determining whether a third accessing request in an instruction associated with the first accessing request and the second accessing request is received, wherein, a type of the third accessing request is the same as a type of the first accessing request and the second accessing request; and
providing the first data and the second data to the target device in response to determining that the third accessing request is not received.

5. The method of claim 1, wherein, the first accessing request and the second accessing request are reading requests, and the source device is the storage device.

6. The method of claim 1, wherein, the first accessing request and the second accessing request are writing requests, the target device is the storage device, and a first target position of the first accessing request in the storage device is continuous with a second target position of the second accessing request in the storage device.

7. An electronic device, comprising:
one or more processors, and
a memory, configured to store one or more programs that, when executed by the one or more processors, cause the electronic device to implement a data accessing method, the method comprising:
obtaining a first accessing request and a second accessing request for a storage device, wherein the first accessing request is associated with first data, and the second accessing request is associated with second data;
loading the first data from a source device to a pre-allocated buffer area, wherein, a size of the buffer area is the same as a size of a single physical storage block of the storage device;
determining whether a first size of the second data is lower than a second size of an available space of the buffer area, wherein the available space of the buffer area refers to a space remaining in a buffer after the first data is loaded to the buffer area;
determining a first part of the second data in response to determining that the first size of the second data is greater than or equal to the second size of the available space, wherein, a size of the first part of the second data is the same as the second size of the available space of the buffer area; and
splicing the first data and the first part of the second data, and providing the first data and the first part of the second data together to a target device associated with the first accessing request and the second accessing request;
updating the available space of the buffer area as all space of the buffer area after providing the first data and the first part of the second data to the target device; and
loading a second part of the second data which is different from the first part of the second data to the updated available space.

8. The electronic device of claim 7, the method further comprises:
determining whether a third accessing request in an instruction associated with the first accessing request and the second accessing request is received, wherein, a type of the third accessing request is the same as a type of the first accessing request and the second accessing request; and
providing the second part of the second data to the target device in response to determining that the third accessing request is not received.

9. The electronic device of claim 7, the method further comprises:
loading the second data to the available space of the buffer area in response to determining that the first size of the second data is lower than the second size of the available space.

10. The electronic device of claim 9, the method further comprises:
determining whether a third accessing request in an instruction associated with the first accessing request and the second accessing request is received, wherein, a type of the third accessing request is the same as a type of the first accessing request and the second accessing request; and
providing the first data and the second data to the target device in response to determining that the third accessing request is not received.

11. The electronic device of claim 7, wherein, the first accessing request and the second accessing request are reading requests, and the source device is the storage device.

12. The electronic device of claim 7, wherein, the first accessing request and the second accessing request are writing requests, the target device is the storage device, and a first target position of the first accessing request in the storage device is continuous with a second target position of the second accessing request in the storage device.

13. A non-transitory computer readable storage medium having a computer program stored thereon that, when executed by a processor, implements a data accessing method, the method comprising:
　　obtaining a first accessing request and a second accessing request for a storage device, wherein the first accessing request is associated with first data, and the second accessing request is associated with second data;
　　loading the first data from a source device to a pre-allocated buffer area, wherein, a size of the buffer area is the same as a size of a single physical storage block of the storage device;
　　determining whether a first size of the second data is lower than a second size of an available space of the buffer area, wherein the available space of the buffer area refers to a space remaining in a buffer after the first data is loaded to the buffer area;
　　determining a first part of the second data in response to determining that the first size of the second data is greater than or equal to the second size of the available space, wherein, a size of the first part of the second data is the same as the second size of the available space of the buffer area; and
　　splicing the first data and the first part of the second data, and providing the first data and the first part of the second data together to a target device associated with the first accessing request and the second accessing request;
　　updating the available space of the buffer area as all space of the buffer area after providing the first data and the first part of the second data to the target device; and
　　loading a second part of the second data which is different from the first part of the second data to the updated available space.

14. The computer readable storage medium of claim 13, the method further comprises:
　　determining whether a third accessing request in an instruction associated with the first accessing request and the second accessing request is received, wherein, a type of the third accessing request is the same as a type of the first accessing request and the second accessing request; and
　　providing the second part of the second data to the target device in response to determining that the third accessing request is not received.

15. The computer readable storage medium of claim 13, the method further comprises:
　　loading the second data to the available space of the buffer area in response to determining that the first size of the second data is lower than the second size of the available space.

16. The computer readable storage medium of claim 15, the method further comprises:
　　determining whether a third accessing request in an instruction associated with the first accessing request and the second accessing request is received, wherein, a type of the third accessing request is the same as a type of the first accessing request and the second accessing request; and
　　providing the first data and the second data to the target device in response to determining that the third accessing request is not received.

17. The computer readable storage medium of claim 13, wherein, the first accessing request and the second accessing request are reading requests, and the source device is the storage device.

* * * * *